United States Patent [19]
Geery

[11] 3,731,533
[45] May 8, 1973

[54] ELECTRICAL GENERATOR HAVING NON-SALIENT POLES FOR METERING SHAFT ROTATION OF A TURBINE ASSEMBLY

[75] Inventor: Paul W. Geery, Houston, Tex.
[73] Assignee: Dresser Industries, Inc., Dallas, Tex.
[22] Filed: Oct. 20, 1971
[21] Appl. No.: 191,126

Related U.S. Application Data

[62] Division of Ser. No. 866,850, Oct. 16, 1969, Pat. No. 3,636,392.

[52] U.S. Cl. ................................................. 73/231 R
[51] Int. Cl. .................................................. G01f 1/06
[58] Field of Search ............................. 73/229–231; 310/156; 324/174

[56] References Cited

UNITED STATES PATENTS

| | | | |
|---|---|---|---|
| 3,162,042 | 12/1964 | Hart | 73/231 |
| 3,196,681 | 7/1965 | Estrabaud | 73/231 |
| 3,079,795 | 3/1963 | Kowallis | 73/194 |
| 2,522,240 | 9/1950 | Sias | 346/32 |
| 3,043,143 | 7/1962 | Hollmann | 73/231 |
| 3,164,020 | 1/1965 | Groner et al. | 73/231 |

OTHER PUBLICATIONS

Chari et al. "Transistor Instrument Measuring Rotational Speed in R.P.M." in Wireless World Feb. 1967 pg. 81–83

Primary Examiner—Herbert Goldstein
Attorney—Robert W. Mayer et al.

[57] ABSTRACT

A cup-shaped member is attached to a rotating shaft as might be associated with a turbine meter for measuring fluid flow or volume. A permanent magnet ring is mounted internal to the cup member, the ring having a plurality of equispaced alternating north and south poles. A second cup-shaped member is mounted within the permanent magnet ring having a plurality of coils mounted on an iron core therein having non-salient poles, whereby uniform reluctance in the magnetic circuit is maintained regardless of the angular position of the shaft.

In an alternative embodiment, the ring is iron, having the coils mounted thereon, and the permanent magnet is made to rotate in the center portion of the ring.

Circuitry is also described to convert the voltage output from the generator into fluid volume indications as dictated by the rotation of the shaft, such circuitry including a first rectifier connected to an alternating voltage, a rechargeable battery connected to the output of the first rectifier, a second rectifier connected to the alternating voltage and a trigger flip-flop circuit powered by the rechargeable battery and connected to the output of the second rectifier whereby a series of sharply squared output pulses are produced at the output of the trigger circuit in response to the rotation of the shaft. In addition, circuitry is provided for scaling down the number of sharply squared output pulses by a predetermined number whereby the output of the scaling circuit provides a predetermined number of output pulses according to the conventional units of flow as determined by the rotation of the shaft.

2 Claims, 15 Drawing Figures

PATENTED MAY 8 1973 3,731,533

ELECTRICAL GENERATOR HAVING NON-SALIENT POLES FOR METERING SHAFT ROTATION OF A TURBINE ASSEMBLY

This is a division of application Ser. No. 866,850, filed Oct. 16, 1969, Now U.S. Pat. No. 3,636,392.

BACKGROUND OF THE INVENTION

This invention relates generally to fluid flow meters, and in particular to those meters wherein shaft rotation is related to the volume of fluid. Even more particularly, the invention relates to apparatus and electrical circuitry for metering such shaft rotation.

Meters used for the measurement of fluid flow, especially of the turbine and positive displacement rotor types, have a fixed relation of volume flow to rotor shaft revolution. The art has attempted to monitor the shaft rotation by various means, one of which employs a speed reducing gear train coupled to the rotor shaft which drives a mechanical totalizing counter/register to indicate total cumulative volume units in visible decade digits. Such a system, while being mechanically simple, is impractical for providing either an instantaneous rate of flow or a remote readout.

Still another conventional approach employs a switch having one or more contacts which close in response to the rotation of the meter shaft. This could, for example, be a reed relay which is responsive to a magnet mounted on the rotating shaft. The switch contacts for such a device are normally connected to electrical circuitry to either directly advance an electrically pulsed mechanical counter/register, or the switch closures are electrically counted down by a predetermined ratio to drive the pulsed counter register in the proper units. However, for high rotor shaft speeds, switch closure speed may restrict usefulness. Likewise, the lifetime of the switch contacts often limits practical applications.

Another problem relating to monitoring the shaft rotation resides in the very limited amount of torque output available from the rotor shaft, whether it be an impellor, turbine or rotary positive displacement meter for fluids.

It is therefore the primary object of this invention to provide a new and improved apparatus for metering the rotation of a rotating shaft;

It is another object of the invention to provide apparatus for metering rotation of a rotating mechanism; and It is still another object of the invention to provide apparatus and related electrical circuitry for producing various electrical indications of rotational activities having a limited amount of torque.

The objects of the invention are accomplished, briefly, by a new and improved electrical generator apparatus associated with the shaft rotation wherein the reluctance of the air gap in the magnetic circuit is constant for all angular positions of a rotating magnet attached or connected to the shaft, thus enabling the device to utilize the very low torque output available. The uniform reluctance eliminates magnetic detenting or "toothing" as it is known in the art.

These and other objects, features, and advantages of the invention will become apparent to those skilled in the art from a reading of the following detailed description and drawing, in which.

Figure 15:
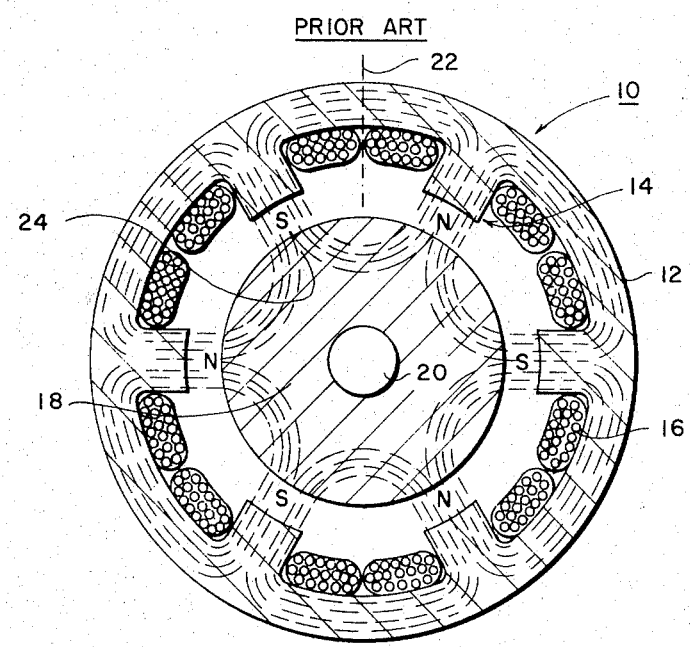
FIG. 15 illustrates in cross section an electrical generator according to the prior art.

Referring now to the drawing in more detail, especially to FIG. 15, there is illustrated an electrical generator 10 embodying principles of the prior art. A soft iron ring 12 having a plurality of islands 14 constitutes the armature of the generator. A plurality of coils 16 are mounted, respectively, between the islands 14, one coil being provided for each island such that each coil actually surrounds an island. Such islands are referred to by those in the art as "salient poles," the purpose for which will be explained hereinafter.

Centered within the ring 12 is a rotating permanent magnet 18 having a plurality of alternating magnetic north and south poles, identified in the drawing by the letters N and S. A shaft 20 in the center of the magnet 18 enables the magnet 18 to rotate.

In the design of such prior art generators, the salient poles cause the magnetic reluctance of the flux path to alternately increase and decrease as the magnet 18 rotates. Thus as the S pole 24 rotates clockwise approximately 30° to the position indicated by the dotted line 22, the air gap is seen to increase between the pole and the ring 12.

Magnetic flux always seeks the lowest reluctance path and the alignment with the lowest reluctance flux paths supports the highest flux density. The permanent magnet rotor 18 always tends to be drawn into the low reluctance alignment and resists displacement from that position. When forcibly rotated by external shaft drive, the rotor 18 presents successively:

A high positive torque load to start from the aligned position (as illustrated in FIG. 15);

A decreasing torque load at 15°;

Near zero torque load at 30°;

An increasing negative torque load at 45° as it is attracted toward the next alignment position; and Finally a high positive torque load as it passes beyond the 60° position (the next island) to repeat the sequence.

The cyclicly varying torque load pattern gives rise to the descriptive term "cogging" or "magnetic detenting." When the external driving force is reduced to a low value or removed, the rotor 18 seeks to align its pole faces with the nearest island 14 (armature pole face), whether it be required to move forward or backward, and will rotate to the aligned position as though a detent device were dictating a preferred rest position.

Thus it should be appreciated that such prior art devices while providing increased voltage and current capabilities, cannot be used for applications where only a low amount of torque is available.

Figure 1:
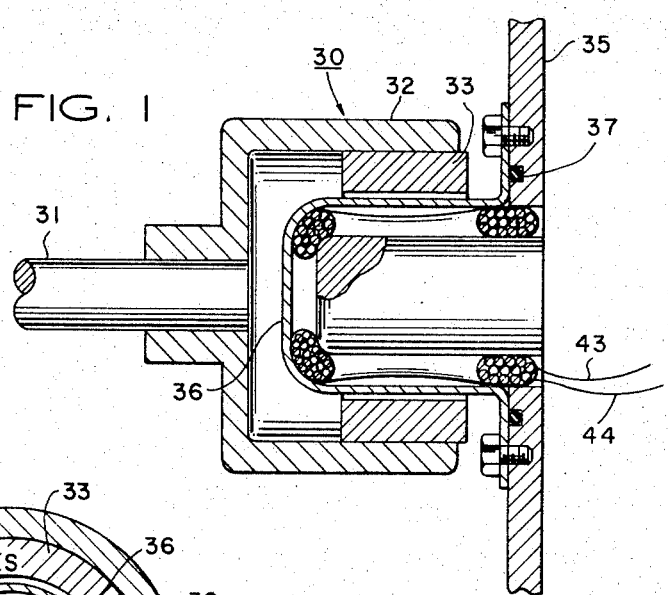
FIG. 1 illustrates in cross section an electrical generator according to the present invention.
Figure 2:
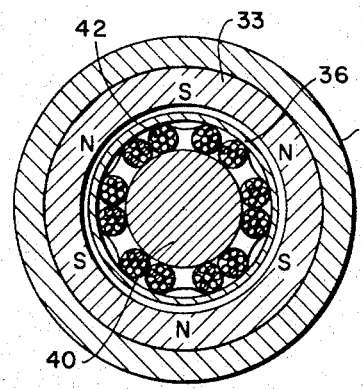
FIG. 2 illustrates in another cross section the generator according to FIG. 1.

FIGS. 1 and 2 illustrate a generator 30 built in accordance with the present invention. A rotatable shaft 31, for example, as might be caused to rotate as in the U. S. Pat. No. 3,429,182 issued to Wemyss, has attached thereto a cup-shaped member 32, preferably non-magnetic, having a permanent magnet ring 33 affixed to the internal surface of the member 32. It should be appreciated, however, that the type of mechanism causing the shaft 31 to rotate forms no part of this invention and is therefore not to be considered a limiting factor. The magnet ring 33 has magnetized into its inner surface a plurality of equispaced magnetic pole faces.

Attached to the meter body cavity wall 35 is a second cup-shaped member 36 constructed, for example, of stainless steel. The O-ring 37 provides a seal between the cup 36 and the wall 35.

Located within the cup 36 is a magnetically permeable non-salient cylindrical core 40 constructed, for example, of iron. Equispaced around the outer periphery of the core 40 is a plurality of coil windings 42, one coil for each of the pole faces on the ring 33. Thus, for six pole faces (three North, three South), there should preferably be six coils 42. For convenience of construction, the induction coils can be cemented onto the core if desired. As shown in FIG. 1, the conductors 43 and 44 from the coil windings 42 are used for the voltage output from the coils which are preferably connected series-aiding in a manner well-known in the art. However, where low voltages are acceptable, and more current capability is desired, the coils could be connected in parallel. The coil connections could be modified to the extent that they are brought out separately.

It should be appreciated that the distance between the core 40 and the ring 33 is constant, regardless of the angular position of the rotating shaft; hence, the reluctance of the magnetic circuit remains constant, with no "detenting" or "cogging."

In the operation of the generator of FIGS. 1 and 2, the flux external to the magnetic ring 33 penetrates the wall of the cup 36, the annular coil space, traverses a portion of the core 40, returns through the coil space and the wall of the cup 36 to re-enter the magnet at an opposing pole face. When the shaft 31 causes the magnetic ring 33 to rotate, a sinusoidal alternating voltage is generated in the coils 42 and appears on the conductors 43 and 44. Although other combinations of pole faces and coils can be used, six coils and six pole faces generates three cycles of alternating voltage per revolution of the shaft 31. Since all of the moving parts are located within the meter body cavity, there is an additional advantage in having no need to provide a fluid-tight seal between moving parts. Thus, it should be appreciated that, by having the shaft 31 rotation be of the type proportional to volume flow, there will appear at the conductors 43 and 44 an alternating voltage proportional to volume flow.

Figure 3:
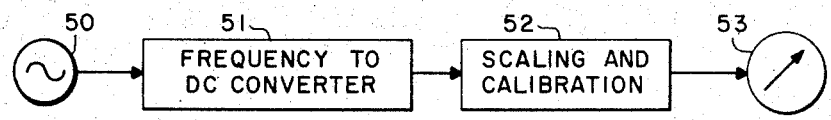
FIG. 3 illustrates in block diagram circuitry for converting an alternating voltage to a rate of fluid flow.

FIG. 3 illustrates in a simplified block diagram circuitry for indicating volume flow. The generated voltage 50 (from conductors 43 and 44) is coupled into a conventional FREQUENCY TO DC CONVERTER 51, from which the resulting DC signal is coupled through conventional scaling and calibration circuitry 52 to a DC meter 53. Thus, by well-known methods and means, the meter 53 is calibrated to read rate of flow in appropriate units of volume and time.

Figure 4:
FIG. 4 illustrates in block diagram alternative circuitry for converting an alternating voltage to a rate of fluid flow.

FIG. 4 illustrates alternative circuitry in block diagram. Instead of using the frequency of the voltage output as in FIG. 3, the amplitude of the voltage is used to provide an indication of volume flow. The generated voltage is coupled through a rectifier circuit 55, a low pass filter 56 and the scaling and calibration circuitry 57 into a DC meter 58. Thus, the meter 58 is calibrated to indicate rate of flow in appropriate units of volume and time.

Figure 5:
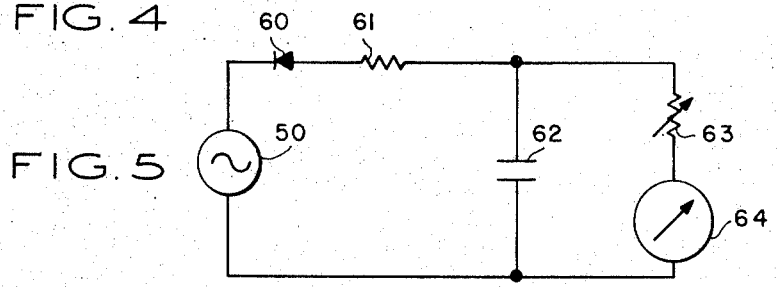
FIG. 5 illustrates in block diagram circuitry for using the meter rotor speed versus voltage amplitude relationship for indicating rate of flow.

FIG. 5 illustrates in block diagram circuitry utilizing the rotor shaft 31 speed versus voltage amplitude relationship for indicating the rate of flow. The negative portion of the generated voltage is coupled into a high impedance RC low pass filter through the rectifier 60, the resistor 61 and capacitor 62 forming the low pass filter. The negative going voltage peaks are loaded by the calibrating (scaling) and ambient temperature compensating network 63, and the DC microammeter 64. This particular arrangement is totally powered by the generated voltage 50. By prohibiting other load connections to the negative half cycles of the generated voltage 50, the accuracy of the rate of flow is maintained. The positive going half cycles are used for other instrumentation circuit loads as desired (not shown). It should be appreciated, however, that the rate of flow could be obtained from the positive cycles and the negative half cycles could then be used for the additional instrumentation.

Figure 6:
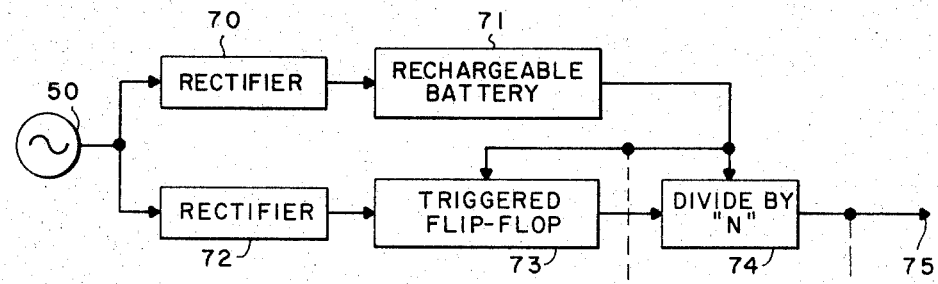
FIGS. 6 and 7 illustrate in block diagram the preferred embodiment of the invention for converting the alternating voltage to a fluid volume rate, as well as circuitry for cumulative storage of total fluid volume flow.
Figure 7:
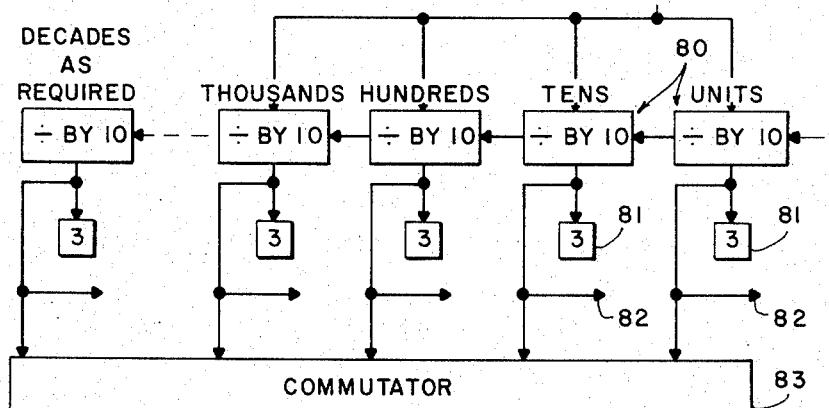

FIGS. 6 and 7 illustrate in block diagram a more detailed description of circuitry for converting the generated voltage 50 into an indication of volumetric rate of flow according to the preferred embodiment of the invention. The positive half cycles of voltage 50 are coupled through the half-wave rectifier and current-limiting diode combination 70 into a rechargeable battery 71, for example, a nickel-cadmium battery, which is used to supply the small amount of power needed for the various trigger and counter circuits. The positive half cycles of voltage 50 are also coupled through a second half-wave rectifier current-limiting diode combination 72 into a triggered flip-flop circuit 73, for example, a Schmitt trigger. The sharply squared output pulses from the trigger circuit 73 are counted down by the N-Divider circuit 74 by the required scaling factor to produce one output pulse for each unit of volume flow through the meter (not shown). The pulse output appearing at terminal 75 may be remotely accumulated (not illustrated) to register total flow volume through the meter. It should be appreciated that the time rate of pulse will also provide rate of flow. For example, the pulse output may be sensed by recognizing logic level voltage changes at the counter output, the logic levels can actuate a solid state switch which may be monitored, or a relay contact closure can be actuated and the contact status may be recognized remotely.

Meters used for monitoring volumetric rate of flow are normally designed such that many rotor revolutions are required to pass a basic unit of volume; hence, the generator device (as in FIG. 1) should preferably be of multiple pole design. In practical designs, the generator and related circuitry produces several thousand pulses from the trigger circuit 73 to be exactly equal to a volume unit of flow through the meter (not shown). It has been discovered that it is possible to arrange the scaling counter/divider circuitry in such a way that meter calibration can be achieved to great accuracy by adjusting the counter/divider ratio in predetermined exact small increments of volume flow units, for example, one tenth of one percent steps.

A typical model of meter now commercially available is designed such that 90 rotor shaft revolutions should pass exactly 1 cubic foot of gas. Fitting such a meter (not shown) with a six pole electric generator according to the invention produces three cycles of alternating voltage per shaft revolution, or 270 pulses of voltage at the output of the trigger circuit 73 for one cubic foot of gas passing through the meter. A conventional unit of flow to be totalized is 100 cubic feet, so that the trigger pulses should be divided by 27,000 to yield one output pulse for each 100 cubic feet of gas to be metered. With an electronic counter, it is convenient to divide by 27 in a first counter and by 1,000 in a following counter. Appropriate wiring connections of the counter circuitry can be chosen to adjust the counter by steps of one count. This change of the counter division ratio by 1 part in 1000 provides an available meter calibration step of one tenth of one percent. Should the meter be not absolutely perfectly dimensioned and prove to be in error by plus or minus a known percentage, the "Divide By 1,000" counter can be adjusted correspondingly to a higher or lower count ratio than 1,000. For example, it can be made 1,001 or 999 for a 0.1 percent calibration correction. Calibration can then be made to within plus or minus 0.05 percent true.

This particular counter system is readily adaptable to a variety of meter sizes and types by adjusting the first counter divider to correspond with the shaft revolution/volume ratio of the given meter design, and preserving a sufficiently large countdown division in the second counter to keep the incremental calibration steps acceptably small.

FIG. 7 illustrates in block diagram additional count storage functions with local and/or remote visual or electronic readout of totalized meter volume flow as dictated by the output pulses from the "Divide By N" circuitry 74. The pulses from circuit 74 are coupled into a digital counter series 80 to continuously accumulate and store the total volume flow. Suitable visual readout indicators 81 can be electrically driven either locally or remotely to display the contents of the totalizer counter in decade digit form. In FIG. 7, the digital counters 81 are illustrated as reading "33333." The contents of the totalizer storage counter may also be read out remotely, as from the output terminals 82, electrically in parallel bit form, or commutated by the commutator 83 and read out in serial bit form from the output terminal 84.

If desired, the totalizer storage counter could be a straight binary counter and the digital electronic readout would be in parallel bit binary form, or, if commutated, in binary form serial by bit. In such an embodiment, the visual readout indicators to display decade digit form would require a binary to decimal interfacing converter.

Figure 8:
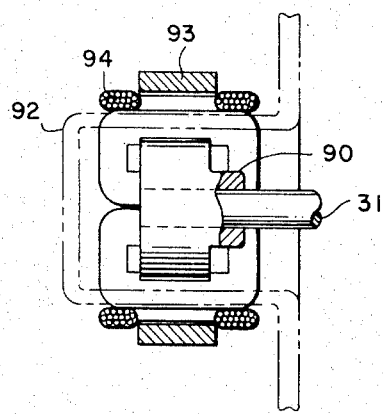
FIG. 8 illustrates in cross section the finished generator according to FIG. 11.
Figure 9:
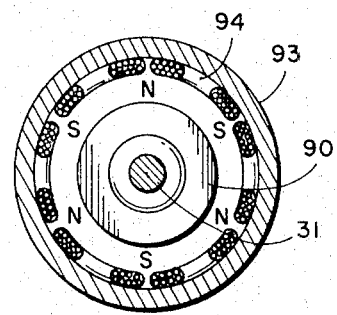
FIG. 9 illustrates in another cross section the generator according to FIG. 8.

FIGS. 8, 9, 10 and 11 illustrate various views of an alternative embodiment of the electrical generator according to the invention. Attached to the rotatable shaft 31 is a permanent magnet 90 having a plurality, for example six, equispaced pole faces around its periphery, alternately marked as N, S and N, etc. A stationary, non-magnetic cup member 92, which could be sealably attached to the meter body wall (not shown) as in FIG. 1, encloses the permanent magnet 90. A non-salient ring 93 of a magnetically permeable material, for example iron, is fabricated around the external surface of the cup 92, with a plurality of magnetic coils 94, for example six, located between the magnet 90 and the ring 93, as is best illustrated in FIG. 9. Thus it should be appreciated that the generator of FIGS. 8 and 9, as is the case for the generator of FIG. 1, has a constant reluctance in the magnetic circuits associated with its coils, magnet pole faces and magnetic permeable ring, and that it likewise does not exhibit "detenting" or "cogging" as is characteristic of prior art generators.

Figure 10:
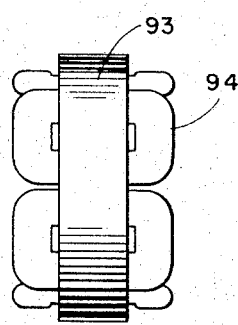
FIG. 10 illustrates a top plan view of the coil assembly on the generator according to FIG. 11.

FIG. 10 illustrates a top plan view of the coils 94 shown in cross section in FIGS. 8 and 9 in relation to the ring 93.

Figure 11:
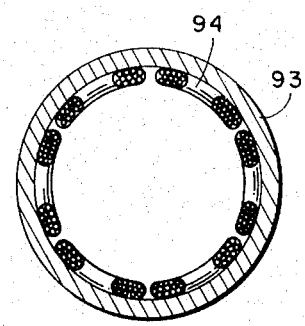
FIG. 11 illustrates in cross section the preliminary construction stage of an alternative embodiment of an electrical generator according to the present invention.

FIG. 11 illustrates on cross section the ring 93 and coil assembly 94 prior to insertion of the rotating magnet 90 on the rotatable shaft 31.

Figures 12, 13:
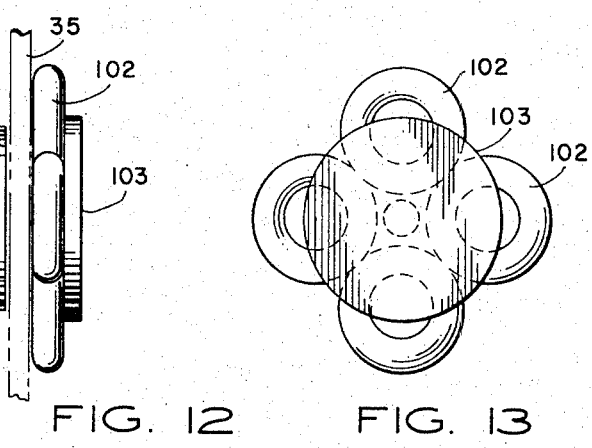
FIG. 12 illustrates in cross section an alternative embodiment of the generator according to the invention.
FIG. 13 illustrates schematically the coil arrangement for the generator according to FIG. 12.

FIG. 12 illustrates an alternative embodiment of a generator having a constant reluctance in its associated magnetic circuits. The cup 100 has a plurality of magnetic pole faces 101 on its surface nearest the wall 35. There could be, for example, four faces, two north and south. On the other side of the non-magnetic cavity wall 35 is mounted a plurality of round bobbin or pie-shaped coils 102, for example, four, best illustrated in FIG. 13. Mounted external to the coils is a magnetically permeable plate member 103 constructed, for example, of iron. As with the other embodiments illustrated and described herein, the path between the magnetic pole faces and the magnetically permeable member remains constant for all positions of the shaft 31.

Figure 14:
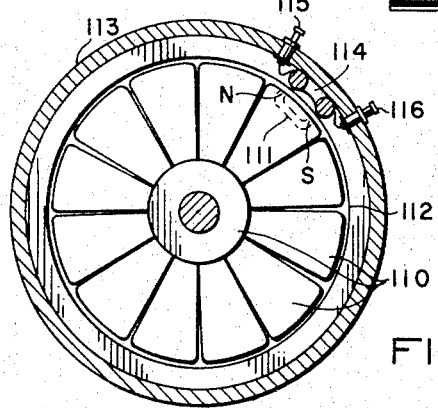
FIG. 14 illustrates an alternative means for metering the rotation of a turbine blade.

FIG. 14 illustrates still another embodiment of an electrical generator having a constant reluctance in its magnetic circuits. A vaned turbine wheel rotor 110 has a permanent magnet 111, having north and south pole faces embedded or otherwise attached to one or more of its rotor blades. A non-magnetic internal fixed fairing sleeve 112 envelopes the rotor blades. External to the sleeve 112 is a casing 113 of magnetically permeable material, for example, of iron. Mounted on the internal surface of the casing 113 is one or more coils 114 having electrical output connections 115 and 116. Due to the constant distance between the magnet 111 and the casing 113 the generator of FIG. 14 is seen to have a constant reluctance for all positions of the turbine blades.

Thus there has been described and illustrated herein various embodiments of generators having constant reluctance and which fail to exhibit the detenting and cogging characteristic which have heretofore kept electrical generators from being used in low torque applications. There has also been described new and useful circuitry for using such generators. Obvious modifications of the embodiments described herein will occur to those skilled in the art. For example, the generator according to the invention would perform exactly as described if the permanent magnet were relieved or notched between adjacent north and south poles, leaving it star-shaped, or, it could be actually a bar magnet, or the U shaped magnet in the rotor blade tip. In these cases the permanent magnet poles would now be visually prominent and conspicuous in form and therefore salient, even though the reluctance paths would still have no salient (prominent and conspicuous) variations with shaft position. It is important only that there be no salient poles on the armature assembly to cause changes in the reluctance of the magnetic flux path as the permanent magnet is rotated. The magnetic poles exist as finite areas on the permanent magnet surface and on a cylindrical or ring-shaped magnet are not visible or conspicuous (non-salient). If the magnet is bar-shaped, U-shaped or star-shaped, the pole faces are then conspicuous and the magnet form is then described as salient. However, this would not affect the non-salient armature form disclosed here to achieve the performance described. Furthermore, although the preferred embodiment contemplates an iron core, the assemblies described herein are also operative if the magnetically permeable member were absent, as with air, or were made of some non-conductive material having a magnetic permeability of one. However, these embodiments have been presented as being illustrative only of the invention and should not be construed in a limiting sense.

The embodiments of the invention in which an exclusive property or privilege is claimed are defined as follows:

1. An apparatus for metering the rotational activity of a turbine assembly, comprising:
    a rotatable turbine assembly having a vaned turbine wheel rotor, said rotor having at least one rotor blade;
    a permanent magnet embedded in the tip of said at least one blade;
    a ring-shaped non-salient member of magnetically permeable material enclosing said turbine wheel rotor;
    at least one induction coil mounted on the internal surface of said ring;
    conductor means connected to said at least one coil for monitoring the alternating voltage induced in said at least one coil relating to the rotation of said rotor; and
    means for converting the frequency of said alternating voltage into an indication of the rate of rotation of said shaft, said means for converting the frequency comprising:
    a first rectifier connected to said alternating voltage;
    a rechargeable battery connected to the output of said first rectifier;
    a second rectifier connected to said alternating voltage; and
    a trigger flip-flop circuit powered by said rechargeable battery and connected to the output of said second rectifier, whereby a series of sharply squared output pulses are produced at the output of said trigger circuit responsive to the rotation of said shaft.

2. The apparatus according to claim 1, including in addition thereto circuit means for scaling down the number of sharply-squared output pulses by a predetermined number whereby the output of said scaling circuit provides a predetermined number of output pulses according to conventional units of flow as determined by the rotation of said shaft.

* * * * *